(12) United States Patent
Garascia et al.

(10) Patent No.: US 9,412,980 B2
(45) Date of Patent: Aug. 9, 2016

(54) BATTERY CELL ASSEMBLY

(71) Applicant: LG Chem, Ltd., Seoul (KR)

(72) Inventors: Michael P. Garascia, Waterford, MI (US); Alexander Jeffrey Smith, White Lake, MI (US)

(73) Assignee: LG Chem, Ltd., Seoul (KR)

( * ) Notice: Subject to any disclaimer, the term of this patent is extended or adjusted under 35 U.S.C. 154(b) by 127 days.

(21) Appl. No.: 14/516,667

(22) Filed: Oct. 17, 2014

(65) Prior Publication Data

US 2016/0111691 A1    Apr. 21, 2016

(51) Int. Cl.
| | |
|---|---|
| *H01M 6/42* | (2006.01) |
| *H01M 2/10* | (2006.01) |
| *H01M 10/6555* | (2014.01) |
| *H01M 10/647* | (2014.01) |
| *H01M 10/613* | (2014.01) |

(52) U.S. Cl.
CPC .......... *H01M 2/1016* (2013.01); *H01M 10/613* (2015.04); *H01M 10/647* (2015.04); *H01M 10/6555* (2015.04)

(58) Field of Classification Search
CPC .......... H01M 10/613; H01M 10/6557; H01M 10/647; H01M 10/6555; H01M 10/6566; H01M 10/6569; H01M 10/0468; H01M 10/0481; H01M 10/0486; H01M 10/0525
See application file for complete search history.

(56) References Cited

U.S. PATENT DOCUMENTS

| | | | |
|---|---|---|---|
| 1,587,425 A | 6/1926 | Schepp | |
| 2,273,244 A | 2/1942 | Cornelius | |
| 2,391,859 A | 1/1946 | Babcock | |
| 3,503,558 A | 3/1970 | Galiulo et al. | |
| 3,522,100 A | 7/1970 | Lindstrom | |
| 3,550,681 A | 12/1970 | Stier et al. | |
| 3,964,930 A | 6/1976 | Reiser | |
| 4,009,752 A | 3/1977 | Wilson | |

(Continued)

FOREIGN PATENT DOCUMENTS

| | | |
|---|---|---|
| DE | 19639115 A | 3/1998 |
| EP | 1577966 A | 9/2005 |

(Continued)

OTHER PUBLICATIONS

U.S. Appl. No. 13/936,556, filed Jul. 8, 2013 entitled Battery Assembly.

(Continued)

*Primary Examiner* — Patrick Ryan
*Assistant Examiner* — Ben Lewis
(74) *Attorney, Agent, or Firm* — Buckert Patent & Trademark Law Firm, PC; John F. Buckert

(57) ABSTRACT

A battery cell assembly having first and second rectangular-shaped end plates, a battery cell, and a metal spring clip are provided. The first rectangular-shaped end plate includes first and second grooves, and the second rectangular-shaped end plate includes first and second grooves. The battery cell is disposed between the first and second rectangular-shaped end plates. The metal spring clip has first and second end portions. The first end portion is disposed in the first groove of the first rectangular-shaped end plate, and the second end portion is disposed in the first groove of the second substantially rectangular-shaped end plate to bias the first rectangular-shaped end plate toward the second rectangular-shaped end plate.

16 Claims, 6 Drawing Sheets

(56) References Cited

U.S. PATENT DOCUMENTS

| | | |
|---|---|---|
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Horstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0182493 A1 | 12/2002 | Ovshinsky et al. |
| 2003/0080714 A1 | 5/2003 | Inoue et al. |
| 2003/0211384 A1 | 11/2003 | Hamada et al. |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0142653 A1* | 6/2009 | Okada ............... H01M 2/1077 429/120 |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0189523 A1 | 8/2011 | Eom |
| 2012/0082880 A1 | 4/2012 | Koetting et al. |
| 2012/0171543 A1 | 7/2012 | Hirsch et al. |
| 2013/0045410 A1 | 2/2013 | Yang et al. |
| 2013/0136136 A1 | 5/2013 | Ando et al. |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |

FOREIGN PATENT DOCUMENTS

| | | | |
|---|---|---|---|
| EP | 1852925 A | | 11/2007 |
| EP | 2262048 A | | 12/2010 |
| GB | 481891 A | | 3/1938 |
| JP | 08111244 A | | 4/1996 |
| JP | H09129213 A | | 5/1997 |
| JP | H09219213 A | | 8/1997 |
| JP | 2001105843 A | | 4/2001 |
| JP | 2002038033 A | | 2/2002 |
| JP | 2002319383 A | | 10/2002 |

(56) References Cited

FOREIGN PATENT DOCUMENTS

| | | |
|---|---|---|
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 1020100119497 A | 11/2010 |
| KR | 1020100119498 A | 11/2010 |
| KR | 1020110013269 A | 2/2011 |
| KR | 1020110013270 A | 2/2011 |
| KR | 20110126764 A | 11/2011 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | 2011145830 A2 | 11/2011 |

OTHER PUBLICATIONS

U.S. Appl. No. 14/059,547, filed Oct. 22, 2013 entitled Battery Cell Assembly.
U.S. Appl. No. 14/273,572, filed May 9, 2014 entitled Battery Pack and Method of Assembling the Battery Pack.
U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
Written Opinion for International application No. PCT/KR2014/002090 dated May 26, 2014.
"Gasket". Merriam-Webster. Merriam-Webster. Web. May 30, 2012. <http://www.merriam-webster.com/dictionary/gasket>.
International Search Report for International application No. PCT/KR2013/004015 dated Sep. 26, 2013.
International Search Report; International Application No. PCT/KR2009/000258; International Filing Date: Jan. 16, 2009; Date of Mailing: Aug. 28, 2009; 2 pages.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2010/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.

* cited by examiner

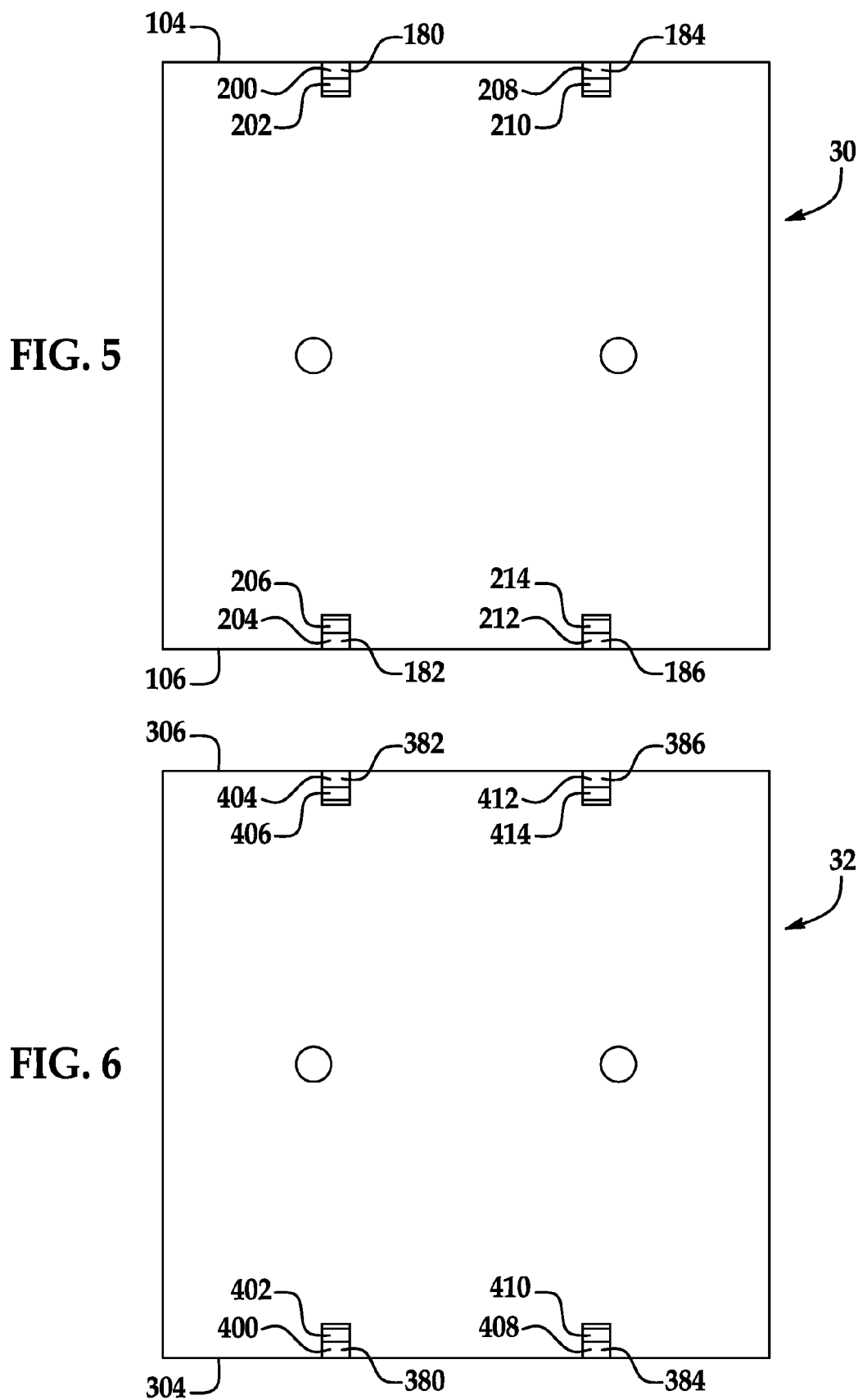

BATTERY CELL ASSEMBLY

BACKGROUND

The inventors herein have recognized a need for an improved battery cell assembly having end plates and frame members that can be readily coupled together utilizing externally disposed metal spring clips.

SUMMARY

A battery cell assembly in accordance with an exemplary embodiment is provided. The battery cell assembly includes a first substantially rectangular-shaped end plate having first and second sides. The first substantially rectangular-shaped end plate further includes first and second grooves extending into the first side thereof that are disposed proximate to first and second ends respectively, of the first substantially rectangular-shaped end plate. The battery cell assembly further includes a second substantially rectangular-shaped end plate having first and second sides. The second substantially rectangular-shaped end plate further includes first and second grooves extending into the first side thereof that are disposed proximate to first and second ends respectively, of the second substantially rectangular-shaped end plate. The battery cell assembly further includes a first battery cell that is disposed and held between the first and second substantially rectangular-shaped end plates. The battery cell assembly further includes a first metal spring clip having first and second end portions. The first end portion of the first metal spring clip is disposed in the first groove of the first substantially rectangular-shaped end plate, and the second end portion of the first metal spring clip is disposed in the first groove of the second substantially rectangular-shaped end plate to bias the first substantially rectangular-shaped end plate toward the second substantially rectangular-shaped end plate. The battery cell assembly further includes a second metal spring clip having first and second end portions. The first end portion of the second metal spring clip is disposed in the second groove of the first substantially rectangular-shaped end plate and the second end portion of the second metal spring clip is disposed in the second groove of the second substantially rectangular-shaped end plate to bias the first substantially rectangular-shaped end plate toward the second substantially rectangular-shaped end plate.

BRIEF DESCRIPTION OF THE DRAWINGS

FIG. 5 is a top view of a first side of a first substantially rectangular-shaped end plate utilized in the battery cell assembly of FIG. 1;

FIG. 6 is a bottom view of a first side of a second substantially rectangular-shaped end plate utilized in the battery cell assembly of FIG. 1;

DETAILED DESCRIPTION

Figure 1:
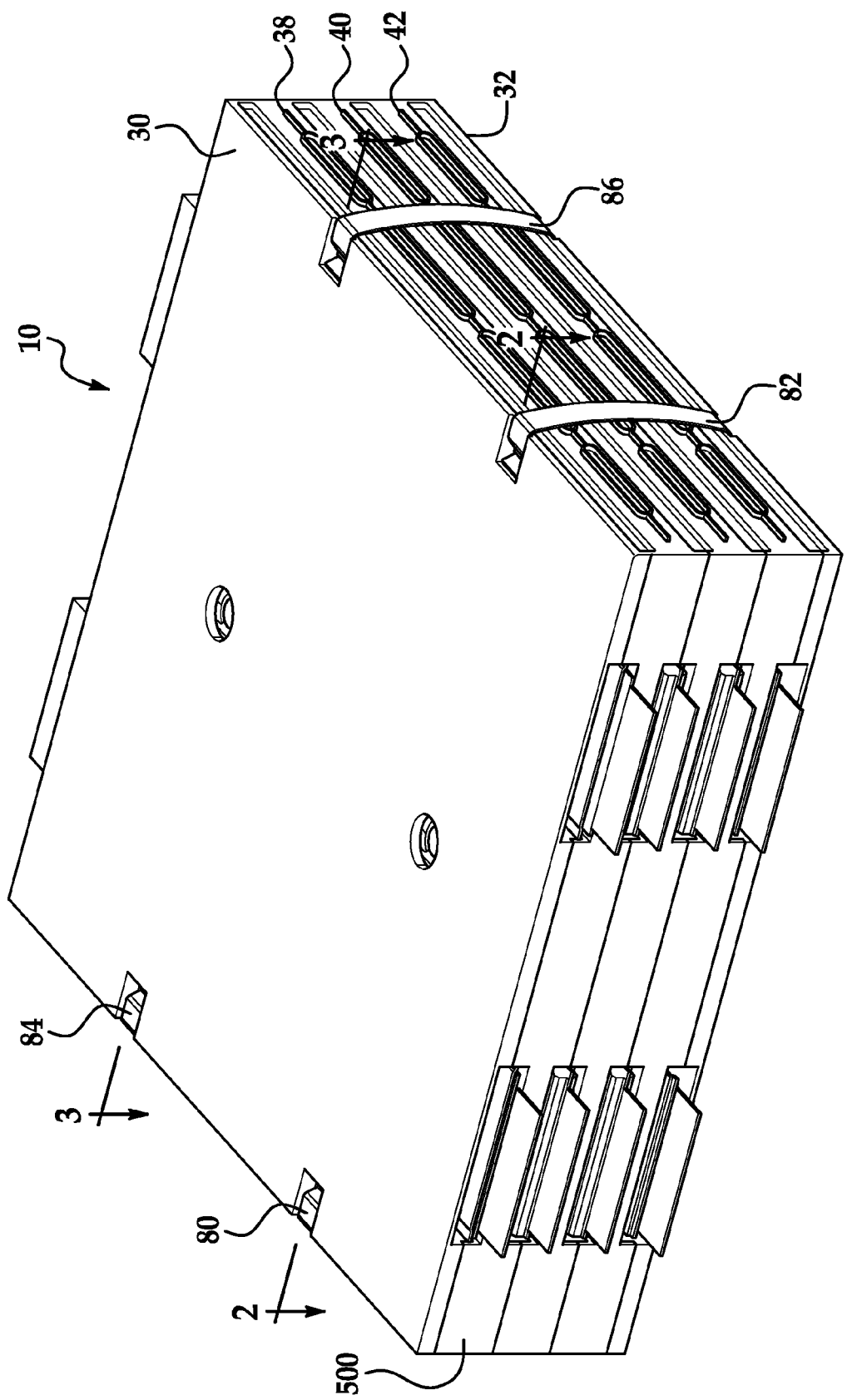
FIG. 1 is a schematic of a battery cell assembly in accordance with an exemplary embodiment.
Figure 2:
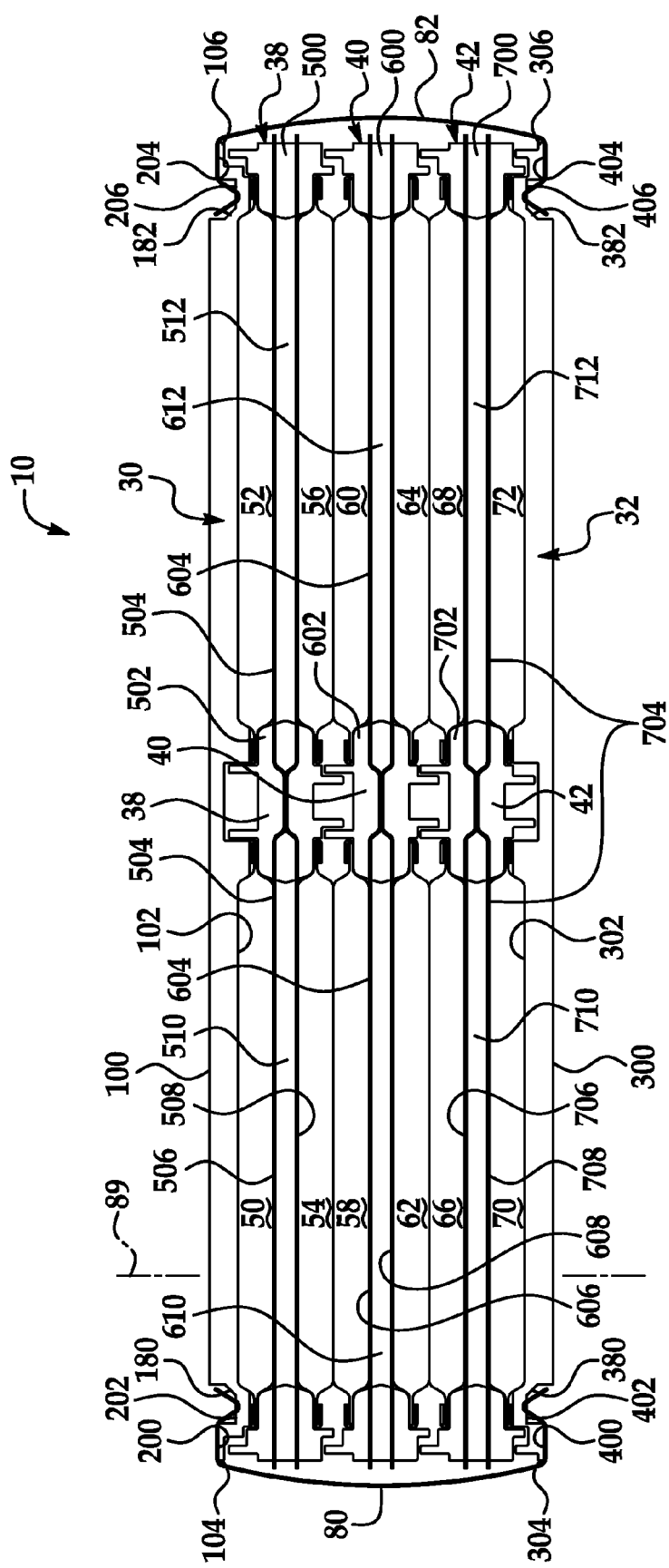
FIG. 2 is a cross-sectional schematic of the battery cell assembly of FIG. 1 taken along lines 2-2.

Referring to FIGS. 1-2, a battery cell assembly 10 in accordance with an exemplary embodiment is provided. The battery cell assembly 10 includes first and second substantially rectangular-shaped end plates 30, 32, frame members 38, 40, 42, battery cells 50, 52, 54, 56, 58, 60, 62, 64, 66, 68, 70, 72, and metal spring clips 80, 82, 84, 86.

The first and second substantially rectangular-shaped end plates 30, 32 are utilized to hold the remaining components of the battery cell assembly 10 therebetween. In an exemplary embodiment, the first and second substantially rectangular-shaped end plates 30, 32 are constructed of plastic. In an alternative embodiment, the end plates 30, 32 could be constructed of other materials such as a metal or a ceramic material for example.

Referring to FIGS. 1-5, the first substantially rectangular-shaped end plate 30 has first and second sides 100, 102, and first and second ends 104, 106. The first substantially rectangular-shaped end plate 30 further includes grooves 180, 182, 184, 186 extending therein.

Figure 3:
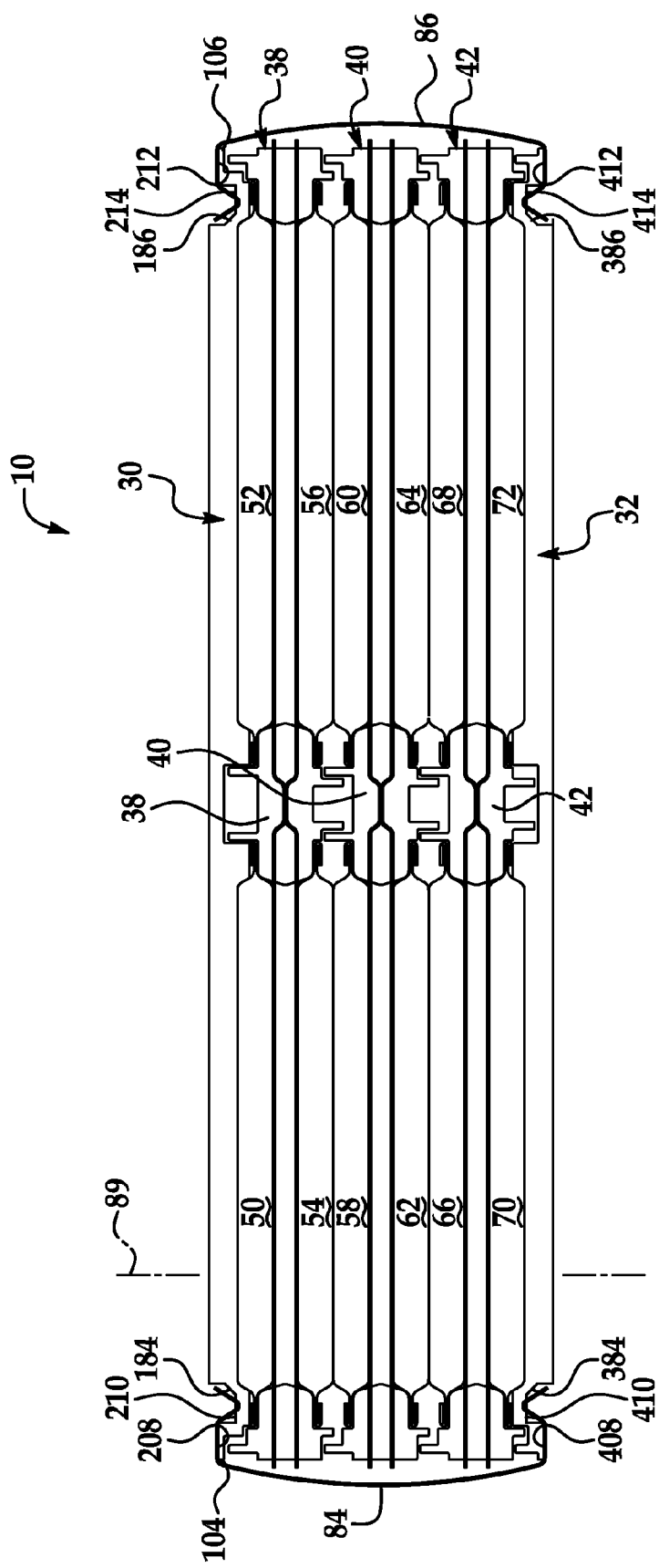
FIG. 3 is another cross-sectional schematic of the battery cell assembly of FIG. 1 taken along lines 3-3.
Figure 4:
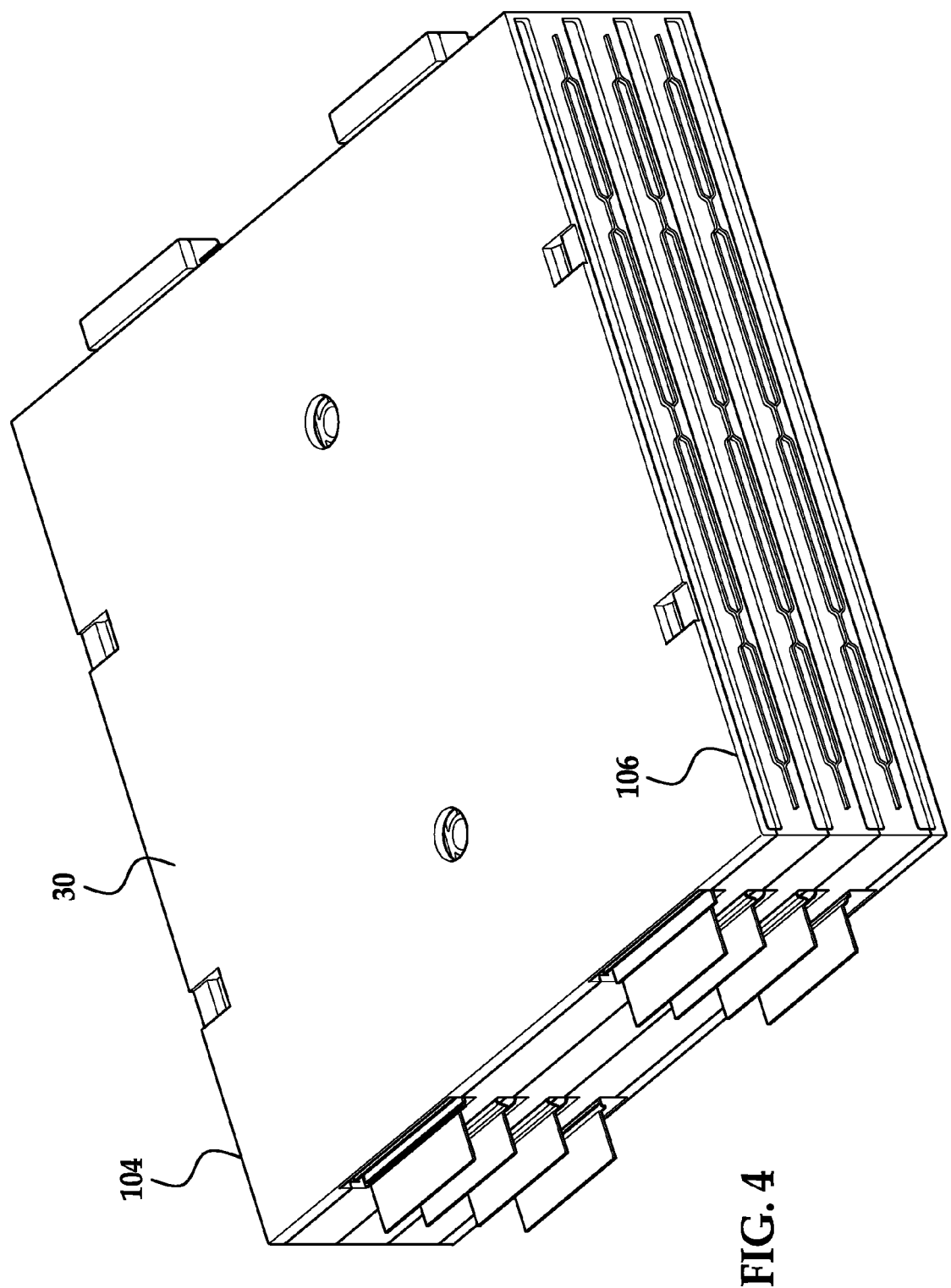
FIG. 4 is a schematic of the battery cell assembly of FIG. 1 before first, second, third and fourth metal spring clips are disposed on first and second substantially rectangular-shaped end plates.

Referring to FIGS. 2 and 3, the grooves 180, 184 extend into the first side 100 and are disposed proximate to the first end 104. The grooves 180, 184 are configured to receive portions of the metal spring clips 80, 84, respectively, therein.

The groove 180 includes groove portions 200, 202. The groove portion 200 is disposed adjacent to and communicates with the groove portion 202. The groove portion 200 extends from the first end 104 a predetermined distance toward the second end 106. Also, the groove portion 200 extends a first depth into the end plate 30 parallel to a vertical axis 89 of the battery cell assembly 10. The groove portion 202 extends a second depth into the end plate 30 parallel to the vertical axis 89 of the battery cell assembly 10. The second depth is greater than the first depth.

The groove 184 includes groove portions 208, 210. The groove portion 208 is disposed adjacent to and communicates with the groove portion 210. The groove portion 208 extends from the first end 104 a predetermined distance toward the second end 106. Also, the groove portion 208 extends a first depth into the end plate 30 parallel to the vertical axis 89 of the battery cell assembly 10. The groove portion 210 extends the second depth into the end plate 30 parallel to the vertical axis 89 of the battery cell assembly 10.

The grooves 182, 186 extend into the first side 100 and are disposed proximate to the second end 106. The grooves 182, 186 are configured to receive portions of the metal spring clips 82, 86, respectively, therein.

The groove 182 includes groove portions 204, 206. The groove portion 204 is disposed adjacent to and communicates with the groove portion 206. The groove portion 204 extends from the second end 106 a predetermined distance toward the first end 104. Also, the groove portion 204 extends the first depth into the end plate 30 parallel to the vertical axis 89 of the battery cell assembly 10. The groove portion 206 extends the second depth into the end plate 30 parallel to the vertical axis 89 of the battery cell assembly 10.

The groove 186 includes groove portions 212, 214. The groove portion 212 is disposed adjacent to and communicates with the groove portion 214. The groove portion 212 extends from the second end 106 a predetermined distance toward the first end 104. Also, the groove portion 212 extends the first depth into the end plate 30 parallel to the vertical axis 89 of the battery cell assembly 10. The groove portion 214 extends the second depth into the end plate 30 parallel to the vertical axis 89 of the battery cell assembly 10.

Referring to FIGS. 2-4 and 6, the second substantially rectangular-shaped end plate 32 has first and second sides 300, 302, and first and second ends 304, 306. The second substantially rectangular-shaped end plate 32 further includes grooves 380, 382, 384, 386. In an exemplary embodiment, the second substantially rectangular-shaped end plate 32 is constructed of plastic. In an alternative embodiment, the end plate 32 could be constructed of other materials such as a metal or a ceramic material for example.

The grooves 380, 384 extend into the first side 300 and are disposed proximate to the first end 304. The grooves 380, 384 are configured to receive portions of the metal spring clips 80, 84, respectively, therein.

The groove 380 includes groove portions 400, 402. The groove portion 400 is disposed adjacent to and communicates with the groove portion 402. The groove portion 400 extends from the first end 304 a predetermined distance toward the second end 306. Also, the groove portion 400 extends a first depth into the end plate 32 parallel to the vertical axis 89 of the battery cell assembly 10. The groove portion 402 extends second depth into the end plate 32 parallel to the vertical axis 89 of the battery cell assembly 10. The second depth is greater than the first depth.

The groove 384 includes groove portions 408, 410. The groove portion 408 is disposed adjacent to and communicates with the groove portion 410. The groove portion 408 extends from the first end 304 a predetermined distance toward the second end 306. Also, the groove portion 408 extends the first depth into the end plate 32 parallel to the vertical axis 89 of the battery cell assembly 10. The groove portion 410 extends the second depth into the end plate 32 parallel to the vertical axis 89 of the battery cell assembly 10.

The grooves 382, 386 extend into the first side 300 and are disposed proximate to the second end 306. The grooves 382, 386 are configured to receive portions of the metal spring clips 82, 86, respectively, therein.

The groove 382 includes groove portions 404, 406. The groove portion 404 is disposed adjacent to and communicates with the groove portion 406. The groove portion 404 extends from the second end 306 a predetermined distance toward the first end 304. Also, the groove portion 404 extends the first depth into the end plate 32 parallel to the vertical axis 89 of the battery cell assembly 10. The groove portion 406 extends the second depth into the end plate 32 parallel to the vertical axis 89 of the battery cell assembly 10.

The groove 386 includes groove portions 412, 414. The groove portion 412 is disposed adjacent to and communicates with the groove portion 414. The groove portion 412 extends from the second end 306 a predetermined distance toward the first end 304. Also, the groove portion 412 extends the first depth into the end plate 32 parallel to the vertical axis 89 of the battery cell assembly 10. The groove portion 414 extends the second depth into the end plate 32 parallel to the vertical axis 89 of the battery cell assembly 10.

Referring to FIGS. 1 and 2, the frame member 38 and the first substantially rectangular-shaped end plate 30 are configured to hold the battery cells 50, 52 therebetween. The frame member 38 and the frame member 40 are configured to hold the battery cells 54, 56, 58, 60 therebetween. Further, the frame member 40 and the frame member 42 are configured to hold the battery cells 62, 64, 66, 68 therebetween. Finally, the frame member 40 and the second substantially rectangular-shaped end plate 32 are configured to hold the battery cells 70, 72 therebetween.

Referring to FIG. 2, the frame member 38 includes a rectangular ring-shaped body portion 500, a central member 502, and a heat exchanger 504. The rectangular ring-shaped body portion 500 defines a central region. In an exemplary embodiment, the rectangular ring-shaped body portion 500 is constructed of plastic. The central member 502 is coupled to opposite walls of the rectangular ring-shaped body portion 500 and extends across the central region defined by the rectangular ring-shaped body portion 500. In an exemplary embodiment, the central member 502 is constructed of plastic and is integrally formed with the rectangular ring-shaped body portion 500. The metal plates 506, 508 have peripheral ends coupled to outer walls of the rectangular ring-shaped body portion 500. The metal plates 506, 508 further extend through the central member 502. The metal plates 506, 508 define open regions 510, 512 therebetween for receiving air therethrough from an external air source. The metal plate 506 is disposed against the battery cells 50, 52 and extracts heat energy from the battery cells 50, 52 to cool the batteries cells 50, 52. Further, the metal plate 508 is disposed against the battery cells 54, 56 and extracts heat energy from the battery cells 54, 56 to cool the batteries cells 54, 56.

The frame member 40 includes a rectangular ring-shaped body portion 600, a central member 602, and a heat exchanger 604. The rectangular ring-shaped body portion 600 defines a central region. In an exemplary embodiment, the rectangular ring-shaped body portion 600 is constructed of plastic. The central member 602 is coupled to opposite walls of the rectangular ring-shaped body portion 600 and extends across the central region defined by the rectangular ring-shaped body portion 600. In an exemplary embodiment, the central member 602 is constructed of plastic and is integrally formed with the rectangular ring-shaped body portion 600. The metal plates 606, 608 have peripheral ends coupled to outer walls of the rectangular ring-shaped body portion 600. The metal plates 606, 608 further extend through the central member 602. The metal plates 606, 608 define open regions 610, 612 therebetween for receiving air therethrough from an external air source. The metal plate 606 is disposed against the battery cells 58, 60 and extracts heat energy from the battery cells 58, 60 to cool the batteries cells 58, 60. Further, the metal plate 608 is disposed against the battery cells 62, 64 and extracts heat energy from the battery cells 62, 64 to cool the batteries cells 62, 64.

The frame member 42 includes a rectangular ring-shaped body portion 700, a central member 702, and a heat exchanger 704. The rectangular ring-shaped body portion 700 defines a central region. In an exemplary embodiment, the rectangular ring-shaped body portion 700 is constructed of plastic. The central member 702 is coupled to opposite walls of the rectangular ring-shaped body portion 700 and extends across the central region defined by the rectangular ring-shaped body portion 700. In an exemplary embodiment, the central member 702 is constructed of plastic and is integrally formed with the rectangular ring-shaped body portion 700. The metal plates 706, 708 have peripheral ends coupled to outer walls of the rectangular ring-shaped body portion 700. The metal plates 706, 708 further extend through the central member 702. The metal plates 706, 708 define open regions 710, 712 therebetween for receiving air therethrough from an external air source. The metal plate 706 is disposed against the battery cells 66, 68 and extracts heat energy from the battery cells 66, 68 to cool the batteries cells 66, 68. Further, the metal plate 708 is disposed against the battery cells 70, 72 and extracts heat energy from the battery cells 70, 72 to cool the batteries cells 70, 72.

The battery cells 50-72 are each configured to generate an operational voltage. In one exemplary embodiment, the battery cells 50-72 are pouch-type lithium-ion battery cells that have a substantially rectangular-shaped body portion and a pair of electrical terminals. In an exemplary embodiment, the battery cells 50-72 are electrically coupled in series with one another. The structure of the battery cells 50-72 are identical to one another.

Referring to FIGS. 1-3, the metal spring clips 80, 82, 84, 86 are provided to hold the other components of the battery cell assembly 10 together. In particular, the metal spring clips 80, 82, 84, 86 are removably coupled to the first and second substantially rectangular-shaped end plates 30, 32 and bias the end plates 30, 32 toward one another. In an exemplary embodiment, the metal spring clips 80-86 are constructed of steel. In an alternative embodiment, the metal spring clips 80-86 could be constructed of another material such as stainless steel, aluminum, or copper for example. Since the structure of the metal spring clips 80-86 are identical to one another, only the structure of the metal spring clip 80 will be described in greater detail below.

Figure 7:
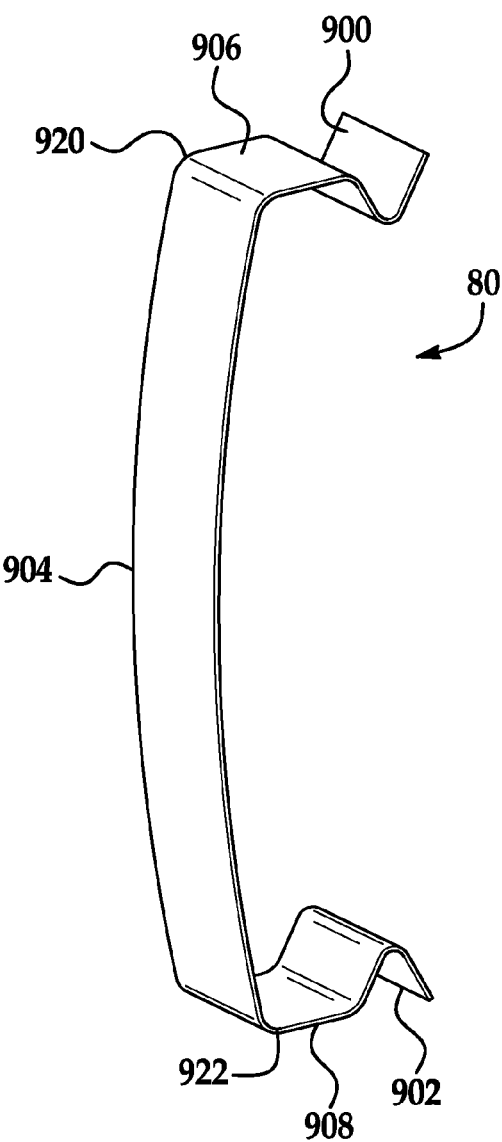
FIG. 7 is a schematic of a metal spring clip utilizing in the battery cell assembly of FIG. 1.
Figure 8:
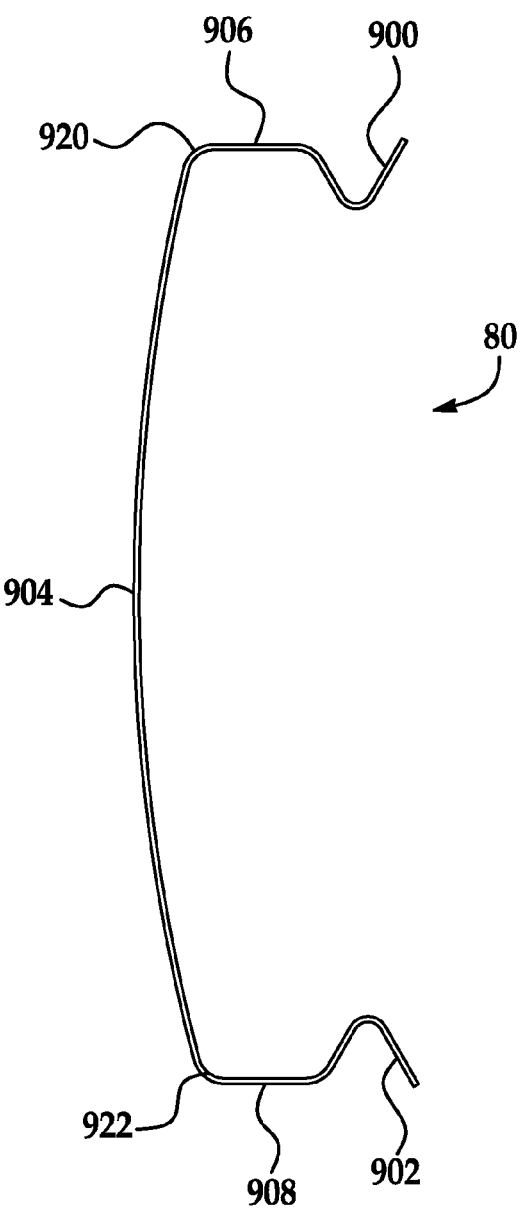
FIG. 8 is a side view of the metal spring clip of FIG. 7.

Referring to FIGS. 2, 7 and 8, the metal spring clip 80 includes first and second end portions 900, 902, a substantially arcuate-shaped portion 904, and first and second substantially flat portions 906, 908. The substantially arcuate-shaped portion 904 includes a first end 920 and a second end 922. Further, the substantially arcuate-shaped portion 904 has a predetermined length such that the substantially arcuate-shaped portion 904 extends from the first end 104 of the first substantially rectangular-shaped end plate 30 to the first end 304 of the second substantially rectangular-shaped end plate 32. The first substantially flat portion 906 is coupled between and to the first end 920 of the substantially arcuate-shaped portion 904 and the first end portion 900. The second substantially flat portion 908 is coupled between and to the second end 922 of the substantially arcuate-shaped portion 904 and the second end portion 902. The first end portion 900 has a v-shaped cross-sectional profile having an apex that points towards the second end portion 902. Similarly, the second portion 900 has a v-shaped cross-sectional profile having an apex that points towards the first end portion 900. The metal spring clip 80 has a first predetermined length that is less than or equal to a distance from the first side 100 of the first substantially rectangular-shaped end plate 30 to the first side 300 of the second substantially rectangular-shaped end plate 32.

Referring to FIGS. 1 and 2, during installation of the metal spring clip 80 on the first and second substantially rectangular shaped end plates 30, 32, the first end portion 900 is disposed in the groove 180, and the second end portion 902 is disposed in the groove 380 of the second substantially rectangular-shaped end plate 32 to bias the first substantially rectangular-shaped end plate 30 toward the second substantially rectangular-shaped end plate 32.

In particular, during installation of the metal spring clip 80 on the end plates 30, 32, the metal spring clip 80 is positioned such that: (i) an apex of the v-shaped cross-section profile of the first end portion 900 contacts a bottom surface defined by the groove portion 202 of the groove 180 in the first substantially rectangular-shaped end plate 30; and (ii) the first substantially flat portion 906 is disposed against a surface defined by the groove portion 200 of the groove 180 in the first substantially rectangular-shaped end plate 30. Further, during installation of the metal spring clip 80 on the end plates 30, 32, the metal spring clip 80 is positioned such that: (i) an apex of the v-shaped cross-section profile of the second end portion 902 contacts a bottom surface defined by the groove portion 402 of the groove 380 in the second substantially rectangular-shaped end plate 32; and (ii) the second substantially flat portion 908 is disposed against a surface defined by the groove portion 400 of the groove 380 in the second substantially rectangular-shaped end plate 32. Still further, during installation of the metal spring clip 80 on the end plates 30, 32, the substantially arcuate-shaped portion 904 is disposed away from the frame members 38, 40, 42 and does not contact the frame members 38, 40, 42.

Referring to FIG. 2, during installation of the metal spring clip 82 on the first and second substantially rectangular shaped end plates 30, 32, a first end portion of the metal spring clip 82 is disposed in the groove 182 of the first substantially rectangular-shaped end plate, and a second end portion of the metal spring clip 82 is disposed in the groove 382 of the second substantially rectangular-shaped end plate 32 to bias the first substantially rectangular-shaped end plate 30 toward the second substantially rectangular-shaped end plate 32.

Referring to FIG. 3, during installation of the metal spring clip 84 on the first and second substantially rectangular shaped end plates 30, 32, a first end portion of the metal spring clip 84 is disposed in the groove 184 of the first substantially rectangular-shaped end plate, and a second end portion of the metal spring clip 84 is disposed in the groove 384 of the second substantially rectangular-shaped end plate 32 to bias the first substantially rectangular-shaped end plate 30 toward the second substantially rectangular-shaped end plate 32.

Further, during installation of the metal spring clip 86 on the first and second substantially rectangular shaped end plates 30, 32, a first end portion of the metal spring clip 86 is disposed in the groove 186 of the first substantially rectangular-shaped end plate, and a second end portion of the metal spring clip 86 is disposed in the groove 386 of the second substantially rectangular-shaped end plate 32 to bias the first substantially rectangular-shaped end plate 30 toward the second substantially rectangular-shaped end plate 32.

The battery cell assembly described and claimed herein provides a substantial advantage over other battery cell assemblies. In particular, the battery cell assembly utilizes metal spring clips to hold the battery cell assembly together, and to readily disassemble the battery cell assembly for repair or maintenance if needed.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a first substantially rectangular-shaped end plate having first and second sides, the first substantially rectangular-shaped end plate further having first and second grooves extending into the first side thereof that are disposed proximate to first and second ends respectively, of the first substantially rectangular-shaped end plate;
a second substantially rectangular-shaped end plate having first and second sides, the second substantially rectangular-shaped end plate further having first and second grooves extending into the first side thereof that are disposed proximate to first and second ends respectively, of the second substantially rectangular-shaped end plate;

a first battery cell being disposed and held between the first and second substantially rectangular-shaped end plates;

a first metal spring clip having first and second end portions, a substantially arcuate-shaped portion, and first and second substantially flat portions; the first substantially flat portion being couple between and to a first end of the substantially arcuate-shaped portion and the first end portion, the second substantially flat portion being coupled between and to a second end of the substantially arcuate-shaped portion and the second end portion, the first end portion of the first metal spring clip being disposed in the first groove of the first substantially rectangular-shaped end plate, and the second end portion of the first metal spring clip being disposed in the first groove of the second substantially rectangular-shaped end plate to bias the first substantially rectangular-shaped end plate toward the second substantially rectangular-shaped end plate; and a second metal spring clip having first and second end portions, the first end portion of the second metal spring clip being disposed in the second groove of the first substantially rectangular-shaped end plate and the second end portion of the second metal spring clip being disposed in the second groove of the second substantially rectangular-shaped end plate to bias the first substantially rectangular-shaped end plate toward the second substantially rectangular-shaped end plate.

2. The battery cell assembly of claim 1, wherein the first metal spring clip has a first predetermined length that is less than or equal to a distance from the first side of the first substantially rectangular-shaped end plate to the first side of the second substantially rectangular-shaped end plate.

3. The battery cell assembly of claim 1, wherein the first end portion of the first metal spring clip has a v-shaped cross-sectional profile.

4. The battery cell assembly of claim 3, wherein the first groove in the first substantially rectangular-shaped end plate has first and second groove portions, the first groove portion being disposed adjacent to and communicating with the second groove portion, the first groove portion extending from the first end of the first substantially rectangular-shaped end plate a predetermined distance toward the second end of the first substantially rectangular-shaped end plate, the first groove portion has a first depth, the second groove portion having a second depth greater than the first depth.

5. The battery cell assembly of claim 4, wherein an apex of the v-shaped cross-section profile contacts a bottom surface defined by the second groove portion of the first groove in the first substantially rectangular-shaped end plate.

6. The battery cell assembly of claim 5, wherein the first substantially flat portion of the first metal spring clip is disposed against a surface defined by the first groove portion of the first groove in the first substantially rectangular-shaped end plate.

7. The battery cell assembly of claim 1, wherein the substantially arcuate-shaped portion of the first metal spring clip has a second predetermined length such that the substantially arcuate-shaped portion extends from the first end of the first substantially rectangular-shaped end plate to the first end of the second substantially rectangular-shaped end plate.

8. The battery cell assembly of claim 1, further comprising a first frame member disposed between the first and second substantially rectangular-shaped end plates such that the first battery cell is disposed between and contacts the first substantially rectangular-shaped end plate and the first frame member.

9. The battery cell assembly of claim 8, wherein the substantially arcuate-shaped portion of the first metal spring clip is disposed away from the first frame member and does not contact the first frame member.

10. The battery cell assembly of claim 8, further comprising a second battery cell that is disposed between and contacts the first substantially rectangular-shaped end plate and the first frame member.

11. The battery cell assembly of claim 10, wherein the first frame member includes a rectangular ring-shaped body portion and a heat exchanger coupled to the rectangular ring-shaped body portion, the first and second battery cells being disposed against the heat exchanger.

12. A battery cell assembly, comprising:

a first substantially rectangular-shaped end plate having first and second sides, the first substantially rectangular-shaped end plate further having first and second grooves extending into the first side thereof that are disposed proximate to first and second ends respectively, of the first substantially rectangular-shaped end plate;

a second substantially rectangular-shaped end plate having first and second sides, the second substantially rectangular-shaped end plate further having first and second grooves extending into the first side thereof that are disposed proximate to first and second ends respectively, of the second substantially rectangular-shaped end plate;

a first battery cell being disposed and held between the first and second substantially rectangular-shaped end plates;

a first metal spring clip having first and second v-shaped end portions, the first v-shaped end portion of the first metal spring clip being disposed in the first groove of the first substantially rectangular-shaped end plate, and the second v-shaped end portion of the first metal spring clip being disposed in the first groove of the second substantially rectangular-shaped end plate to bias the first substantially rectangular-shaped end plate toward the second substantially rectangular-shaped end plate; and a second metal spring clip having first and second v-shaped end portions, the first v-shaped end portion of the second metal spring clip being disposed in the second groove of the first substantially rectangular-shaped end plate and the second v-shaped end portion of the second metal spring clip being disposed in the second groove of the second substantially rectangular-shaped end plate to bias the first substantially rectangular-shaped end plate toward the second substantially rectangular-shaped end plate.

13. The battery cell assembly of claim 12, wherein the first groove in the first substantially rectangular-shaped end plate has first and second groove portions, the first groove portion being disposed adjacent to and communicating with the second groove portion, the first groove portion extending from the first end of the first substantially rectangular-shaped end plate a predetermined distance toward the second end of the first substantially rectangular-shaped end plate, the first groove portion has a first depth, the second groove portion having a second depth greater than the first depth.

14. The battery cell assembly of claim 13, wherein an apex of the first v-shaped end portion of the first metal spring clip contacts a bottom surface defined by the second groove portion of the first groove in the first substantially rectangular-shaped end plate.

15. The battery cell assembly of claim 14, wherein an apex of the first v-shaped end portion of the first metal spring clip contacts a bottom surface defined by the first groove in the first substantially rectangular-shaped end plate.

16. The battery cell assembly of claim 12, wherein the first metal spring clip further includes a substantially arcuate-shaped portion disposed between the first and second v-shaped end portions of the first metal spring clip.

* * * * *